Patented May 27, 1930

1,760,328

UNITED STATES PATENT OFFICE

DANIEL TWISS, OF BALTIMORE, MARYLAND, ASSIGNOR TO HYNSON, WESTCOTT & DUNNING, INC., OF BALTIMORE, MARYLAND, A CORPORATION OF MARYLAND

HALOGENATED ORTHO-SULPHO-BENZOIC ACID COMPOUNDS

No Drawing. Application filed April 4, 1928. Serial No. 267,483.

This invention relates to mono-, di-, tri-, and tetrahalogenated ortho-sulpho-benzoic acid compounds which are useful as intermediates in the preparation of dyes, and to processes for preparing the same. More specifically, this invention relates to di- and tetrahalogenated ortho-sulpho-benzoic acid anhydrides.

The discovery was made that the anhydride of o-sulpho-benzoic acid, the free acid itself and its salts, for instance the acid ammonium salt, can be readily halogenated in fuming sulfuric acid to form mono-, di-, tri- and tetrahalogenated o-sulpho-benzoic acid anhydrides. According to this process it is also possible to prepare mixed halogenated o-sulpho-benzoic acids or anhydrides by subsequent halogenation of a partially halogenated acid, using a different halogen.

The amount of $SO_3$ present in the reaction mixture as well as the amount of halogen used is an important factor in determining the extent and facility of halogenation, e. g., in preparing a tetrahalogenated derivative a certain amount of 60% oleum may be replaced by a greater amount of 50% oleum containing an equivalent amount of $SO_3$ and the same number of halogens introduced thereby. For partially halogenated acids, i. e., a dihalogenated derivative, correspondingly smaller amounts of oleum may be used. The mono- and trihalogenated derivatives may also be prepared by using a suitable amount of $SO_3$ and halogen. I do not wish to be limited to any particular position of the halogen in the nucleus, as this is not definitely known.

The o-sulpho-benzoic acid, its anhydride or its salt, is dissolved in fuming sulfuric acid, heated in an oil bath preferably at about 60–100° C., and the halogen slowly added. As an accelerator a small amount of iodine is used, which, however, is not essential. After the required amount of halogen has been added, the reaction is terminated by elevating the oil bath temperature to about 150–170° C. After cooling the halogenated o-sulpho-benzoic acid anhydride precipitates and can be separated from the remaining sulfuric acid by direct filtration or by mixing with ice water and filtering at a low temperature. The anhydride can be freed from adhering sulfuric acid by washing with glacial acetic acid. On standing at room temperature the anhydrides go over into the acids.

The halogenation is illustrated by the following equations:

Chlorination of the free acid:

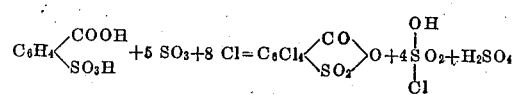

Bromination of the free acid:

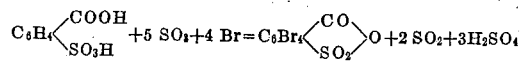

Bromination of the acid ammonium salt:

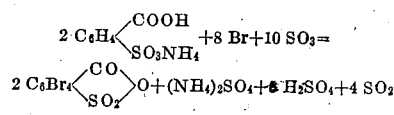

Bromination of the anhydride:

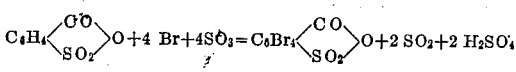

The iodination is similar to the bromination.

*Example 1. Tetrachlor-o-sulpho-benzoic acid anhydride*

Fifty grams of o-sulpho-benzoic acid (or the corresponding amount of the anhydride or of the acid ammonium salt) are dissolved in three hundred grams of about 60% fuming sulfuric acid or an amount of 50% fuming sulfuric acid containing an equivalent amount of $SO_3$. The mixture is heated in an oil bath at 60° C., two grams of iodine are added and a slow current of chlorine is passed through the solution until no more chlorine is absorbed. The reaction is terminated by heating the oil bath at about 150–160° C. After cooling the tetrachlor-o-sulpho-benzoic acid anhydride is filtered from the remaining sulfuric acid.

*Example 2. Tetrabrom-o-sulpho-benzoic acid anhydride*

Fifty five grams of o-sulpho-benzoic acid are dissolved in three hundred and fifty grams of 60% fuming sulfuric acid, the mixture is heated in an oil bath at 80–85° C., and 33 cc. of bromine are gradually added. Two to three grams of iodine may be added as a catalyst. The reaction is terminated by raising the temperature of the oil bath to 160–170° C. After cooling the tetrabrom-o-sulpho-benzoic acid anhydride is isolated as described above. Instead of o-sulpho-benzoic acid, its anhydride or its acid ammonium salt may be used following exactly the same procedure.

*Example 3. Tetraiodo-o-sulpho-benzoic acid anhydride*

Fifty and five tenths grams of o-sulpho-benzoic acid are dissolved in three hundred grams of 60% fuming sulfuric acid, the mixture is heated, and one hundred and twenty-seven grams of iodine are gradually added. Tetraiodo-o-sulpho-benzoic acid is isolated as described before.

*Example 4. Dibrom-o-sulpho-benzoic acid anhydride*

One hundred and ten grams of o-sulpho-benzoic acid are dissolved in four hundred grams of about 35% fuming sulfuric acid. Two grams of iodine are added and then gradually 37 cc. of bromine. The temperature of the oil bath is kept at about 80–85° C. during the addition of the bromine, then heated up to 150–160° C. to terminate the reaction. After cooling the reaction mass is poured onto ice and the precipitated dibrom-o-sulpho-benzoic acid anhydride is filtered at a low temperature. At room temperature the anhydride goes over into the acid.

*Example 5. Diiodo-o-sulpho-benzoic acid anhydride*

One hundred and twenty grams of o-sulpho-benzoic acid are dissolved in four hundred grams of 35% fuming sulfuric acid and one hundred and twenty grams of iodine are added. The diiodo-o-sulpho-benzoic acid is isolated as described in the preceding examples.

The di-chlor-o-sulpho-benzoic acid may be prepared by the same procedure.

In the appended claims, the term "ortho-sulpho-benzoic acid compound" is used to designate the group consisting of itself, its anhydride and its salts, especially the acid ammonium salt.

I claim:

1. A nuclear polyhalogenated ortho-sulpho-benzoic acid compound.
2. A nuclear polyhalogenated ortho-sulpho-benzoic acid anhydride.
3. A nuclear polyhalogenated ortho-sulpho-benzoic acid anhydride having the formula:

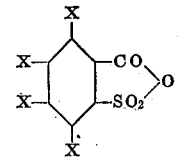

wherein X stands for hydrogen or a halogen, two or four X's being halogen.

4. A nuclear tetrahalogenated ortho-sulpho-benzoic acid compound.
5. A nuclear tetrahalogenated ortho-sulpho-benzoic acid anhydride.
6. A nuclear iodinated ortho-sulpho-benzoic acid compound.
7. A nuclear iodinated ortho-sulpho-benzoic acid anhydride.
8. A nuclear polyhalogenated ortho-sulpho-benzoic acid anhydride having the formula:

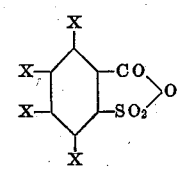

wherein X stands for hydrogen or iodine, two or four X's being iodine.

9. A tetraiodo ortho-sulpho-benzoic acid compound.
10. Tetraiodo ortho-sulpho-benzoic acid anhydride.
11. Process of preparing halogenated ortho-sulpho-benzoic acid compounds which comprises treating an ortho-sulpho-benzoic acid compound with a halogen in fuming sulfuric acid.
12. Process of preparing halogenated ortho-sulpho-benzoic acid compounds which comprises treating an ortho-sulpho-benzoic acid compound with a halogen in fuming sulfuric acid at temperatures between about 60–170° C.
13. Process of preparing halogenated ortho-sulpho-benzoic acid anhydrides which comprises treating ortho-sulpho-benzoic acid with a halogen in fuming sulfuric acid.
14. Process of preparing halogenated ortho-sulpho-benzoic acid anhydrides which comprises treating ortho-sulpho-benzoic acid with a halogen in fuming sulfuric acid at temperatures between about 60–170° C.
15. Process of preparing tetraiodo ortho-sulpho-benzoic acid anhydride which comprises treating ortho-sulpho-benzoic acid with iodine in fuming sulfuric acid.

In testimony whereof, I affix my signature.

DANIEL TWISS.